United States Patent [19]

Malacheski et al.

[11] 4,224,854
[45] Sep. 30, 1980

[54] SHEET CUTTING AND SCORING DEVICE AND METHOD

[76] Inventors: Joseph J. Malacheski; Richard J. Zenda, both of 32 Warner St., Plains, Pa. 18705

[21] Appl. No.: 938,799

[22] Filed: Sep. 1, 1978

[51] Int. Cl.³ .................. B26D 1/06; B26D 3/06; B26D 5/10; B26D 7/02
[52] U.S. Cl. ........................... 83/745; 83/455; 83/614; 83/875; 83/56; 83/522
[58] Field of Search .............. 83/455, 614, 745, 56, 83/743, 522, 862, 875, 879, 880, 881

[56] References Cited
U.S. PATENT DOCUMENTS

| 303,472 | 8/1884 | Tylee | 83/455 |
| 611,238 | 9/1898 | Drinkaus | 83/455 |
| 2,065,380 | 12/1936 | Lamson | 83/455 |
| 2,225,630 | 12/1940 | Gilbert | 83/614 |
| 3,918,337 | 11/1975 | Lindblad | 83/614 |

Primary Examiner—Donald R. Schran
Attorney, Agent, or Firm—Robert K. Youtie

[57] ABSTRACT

A cutting and scoring device and method wherein an elongate body is positioned on one face of a sheet to be worked, having a track extending along the body, a carriage movable along the rack, a tool holder carried by the carriage for movement therealong and located over the sheet, and a tool depending from the tool holder for working engagement with the sheet.

6 Claims, 9 Drawing Figures

SHEET CUTTING AND SCORING DEVICE AND METHOD

BACKGROUND OF THE INVENTION

As is well known to those versed in carpentry and various other do-it-yourself endeavors, including professional artisans, many such projects require the cutting or scoring of various panels, such as plywood, plastic, shelving, and the like. Heretofore such procedures required substantial skill, as with power and hand saws, to achieve a reasonably straight cut, which often resulted in a rough or splintered cut unless special precautions were taken, and subjected the operator and others to the danger of being cut, undue noise and air polluted by sawdust and other kerf material.

SUMMARY OF THE INVENTION

Accordingly, it is an important object of the present invention to provide an appliance and method for cutting and scoring sheet material, such as wood or plastic panels, which appliance and method are extremely simple in construction for economy in manufacture and sale at a reasonable price, adapted for ease and quickness in use, while being entirely safe in operation.

It is a further object of the present invention to provide a sheet cutting and scoring device of the type described which overcomes the difficulties of the prior art mentioned above, substantially eliminates or minimizes noise, effectively obviates air pollution by avoiding the production of dust, produces smooth and well finished cuts without splintering, eliminates the need for guide markings or lines on the work piece, permits of simple and accurate operation on relatively small and odd sized work pieces or remnants, and is readily adapted for cutting the work entirely through or to any easily selected depth.

Still another object of the present invention resides in the provision of a method of sheet cutting and scoring having the advantageous characteristics mentioned hereinbefore, wherein plural adjacent spaced cutters are moved in cutting engagement with a work piece along closely adjacent spaced lines to cut the material, such that the material between the cut line substantially falls apart to relieve against tool binding in the sheet.

Other objects of the present invention will become apparent upon reading the following specification and referring to the accompanying drawings, which form a material part of this disclosure.

The invention accordingly consists in the features of construction, combinations and arrangements of parts and method steps, which will be exemplified in the following description, and of which the scope will be indicated by the appended claims.

DESCRIPTION OF THE PREFERRED EMBODIMENTS

Figure 1:
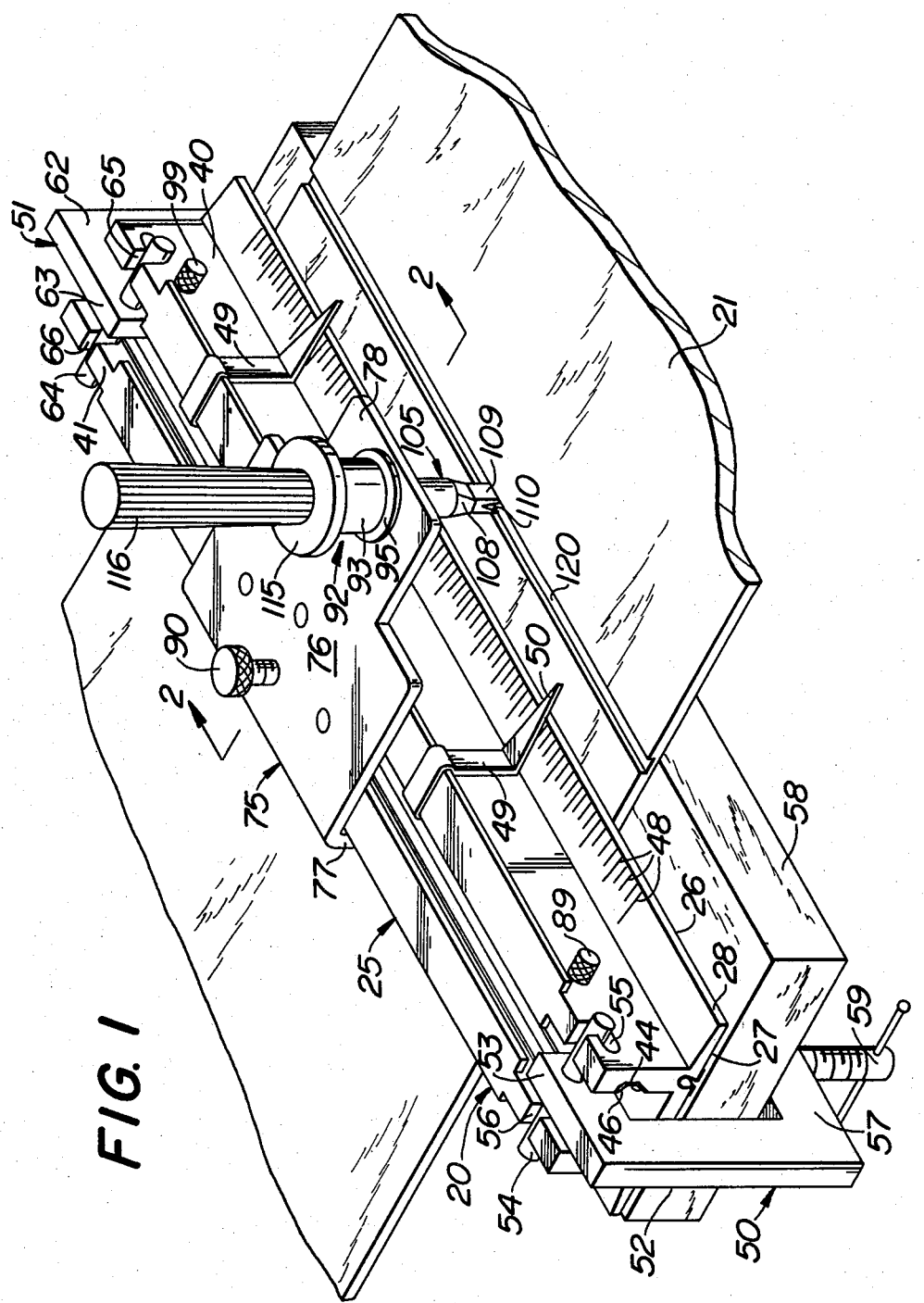
FIG. 1 is a top perspective view showing a sheet cutting and scoring apparatus constructed in accordance with the teachings of the present invention and operatively engaged in practice of the instant method.
Figure 2:
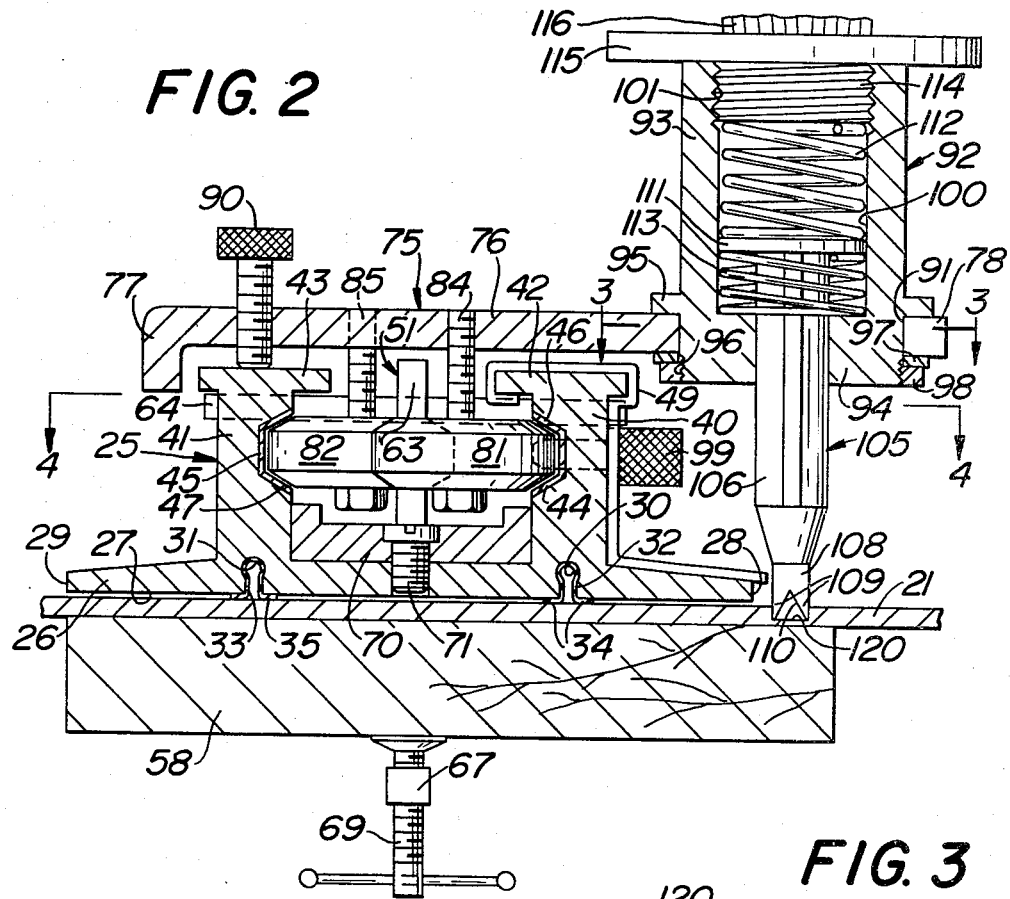
FIG. 2 is a transverse sectional elevational view taken generally along the line 2—2 of FIG. 1.

Referring now more particularly to the drawings, and specifically to FIGS. 1 and 2 thereof, a sheet cutting and scoring device of the present invention is there generally designated 20, and is illustrated in operative association with a panel 21, as in cutting relation therewith.

More particularly, the apparatus 20 includes an elongate, generally straight component part or body 25 having a straight elongate base 26. The body base 26 has a generally flat under surface 27 and is bounded along longitudinal sides by generally parallel, straight sides or edges 28 and 29. Spaced laterally inwardly from respective side edges 28 and 29, the under surface 27 is provided with a pair of generally parallel, longitudinally extending slots or grooves 30 and 31, each provided with a frictional insert or strip, as at 32 and 33. The inserts or strips 32 and 33 may be of vinyl or other suitably frictional material, each having lips or flanges extending exteriorly of the respective groove 30, 31 along the under surface 27 of base 26 for frictional bearing engagement with a work piece or sheet 21. The frictional strip or insert 32 may include external flaps or lips 34 and the strip or insert 33 may include frictional flaps or lips 35. This is best seen in FIG. 2.

Upstanding from the base 26, extending longitudinally therealong and spaced inward from the side edges 28, 29 are a pair of facing, spaced generally parallel rails or upstanding walls 40 and 41. The rails or walls 40 and 41 extend in parallel spaced, facing relation with each other, and each may be provided along its upper edge with a generally horizontally extending flange, as at 42 and 43. The upstanding walls or rails 40 and 41 are provided on their internal or facing sides with longitudinally extending, facing recesses or grooves 44 and 45, respectively provided with groove wear strips or liners 46 and 47. In practice, the base 26 and rails 40 and 41 may be integrally formed, say by extrusion of aluminum or other suitable material, and the liners 46 and 47 may be fabricated of steel, or other suitable material for increased wear resistance.

Along one or both side edges 28, 29 of the base 26 as on the upper surface shown in FIG. 1, there may be provided desired markings or graduations 48. Also, one or more indicators or pointers, as at 49, may be formed of elongate strips conformably bent about flange 42 for sliding adjustment therealong, and provided with a pointed extremity 50 along the graduations 48 for cooperation therewith. Of course, the flange 43 may be similarly provided with indicators, if desired.

At opposite ends of the elongate body 20, there are provided suitable securing means, as at 50 and 51 for detachably securing the body to a work piece or panel 21. Specifically, the securing means 50 may include a generally C-shaped clamp element 52 having its upper end 53 extending inwardly between rails 40 and 41 over the intermediate region of base 26. A cross member or rod 54 may extend transversely through the upper arm 53 of clamp member 52 for engagement at its opposite ends into respective bayonet-type slots 55 and 56 of rails 40 and 41. The lower end of arm 57 of C-member 52 enters beneath the base 26, and a backing member or board 58, where it is provided with a screw clamping element 59 for clamping engagement with the underside of backing member 58. Similarly, the securing means 51 may include a generally C-shaped clamping element 62 having its upper arm 63 extending into the space between rails 40 and 41 at the opposite end remote from securing means 50. A cross piece 64 may extend through the upper C-shaped member arm 63 for removable engagement in respective bayonet-type slots 65 and 66 in respective rails 40 and 41. A lower arm 67 of the C-shaped member (see FIG. 2) passes beneath the backing member or board 58 and is provided with a screw clamping element 69 for bearing engagement with the underside of backing member 58. As the backing member 58 is beneath the work or panel 21, it will be appreciated that the elongate member or body 25 is releasably clamped in fixed relation superposed on the work or panel in a desired relation with respect to the latter.

Figure 5:
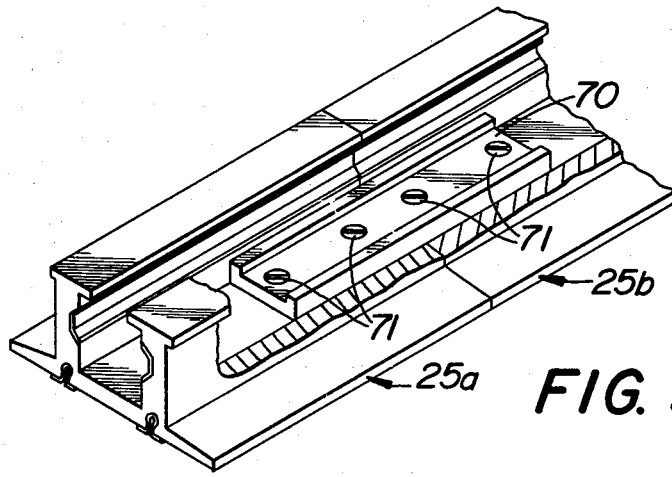
FIG. 5 is a top perspective view showing an elongate body of the apparatus of FIGS. 1-4, apart from the remainder thereof and illustrating a mode of connection to extend the body length.

The elongate member or body 25 may be constituted of plural sections in end to end adjacent relation, if desired. In such condition, it is only necessary to provide a tying member see FIGS. 2 and 5, as at 70, which may extend in overlapping relation with a pair of adjacent elongate body sections 25a and 25b, as seen in FIG. 5, and cross-sectionally configured to conformably occupy a lower region of the space between the base and rails of each respective section. Suitable securing means, such as threaded fasteners 71 may detachably secure the connection member 70 to respective body sections 25a and 25b.

Mounted for reciprocatory movement along elongate body 25 is a carriage, generally designated 75. The carriage may include a generally horizontal member or plate 76 located in spaced relation over and extending across the rails 40 and 41. On one side of the rails 40 and 41, adjacent to the latter rail, the carriage member or plate 76 may be formed with a depending lip or flange 77 extending along and in adjacent spaced relation with respect to the adjacent rail flange 43. A generally horizontal, lateral extension or protrusion 78 may project from carriage member or plate 76, substantially coplanar therewith, laterally outwardly beyond the rail 40.

Figure 4:
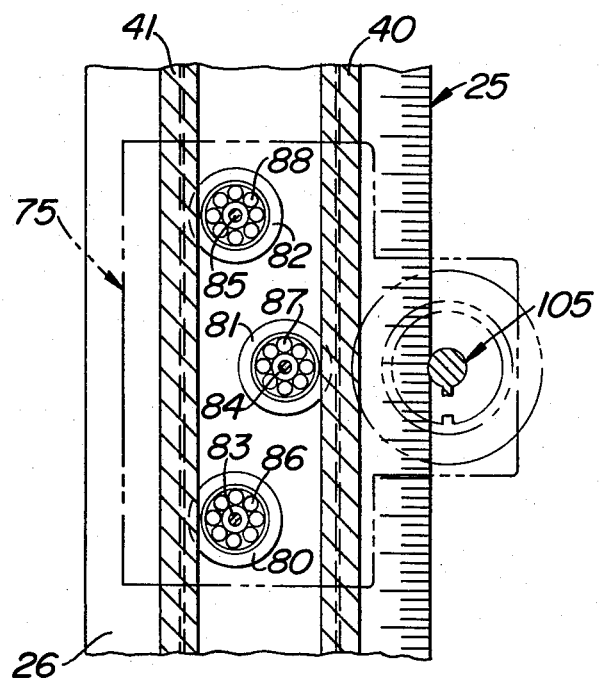
FIG. 4 is a horizontal sectional view taken generally along the line 4—4 of FIG. 2.

Mounting the plate 76 in its horizontal, spaced superposed relation over the rails 40 and 41 are a plurality of generally horizontally disposed wheels or rollers 80, 81 and 82, all located in position between the upstanding rails 40 and 41 and there mounted for rotation about generally vertical axes by respective pins, studs or axles 83, 84 and 85 depending rigidly from the carriage plate 76. As best seen in FIG. 4, the several wheels or rollers 80–82 are preferably journaled by anti-friction bearings 86, 87 and 88 for free rotary movement. Two of the wheels or rollers 80,82 are engaged in rolling relation in one of the rail grooves 44, 45, and the other wheel or roller is engaged in rolling relation in the other rail groove. In the illustrated embodiment, the remotely spaced or distal wheels or rollers 80 and 82 are both rollingly engaged in groove 45, and the remaining, intermediate wheel or roller 81 is rollingly engaged in the opposite groove 44. By such arrangement it is apparent that the carriage 75 is constrained to longitudinal movement along the elongate body 25, being freely reciprocable therealong by virtue of the freely rotatable carriage wheels 80–82. Thus, the rails 40, 41 and their facing grooves 44 and 45 combine to define a track to which the carriage 75 is constrained for back and forth movement therealong.

Adjacent to opposite ends of body 25 there may be provided releasable stop means limiting carriage movement such as screws 89 and 99 extending through one rail 40 and into the inter-rail space. Stop screws 89 and 99 may be withdrawn to pass the carriage, if desired.

If desired, the carriage 75 may be effectively positioned and retained or locked in a selected position along the body 25, as by a threaded fastener or lock member extending in threaded relation downwardly through plate 76 for frictional retaining engagement with the upper surface of rail flange 43. Of course, the lock member or fastener 90 may be released by upward withdrawal to free the carriage for its reciprocatory movement.

The lateral extension 78 of carriage 75 may be provided with a vertical through hole 91 receiving a tool holder, generally designated 92. The tool holder may be constituted of a generally cylindrical, vertically disposed body 93 having its lower end closed by an end wall 94 and assembled with the extension 78 by insertion of the lower region of cylindrical body 93 downwardly through the opening 91. A limit member or annular shoulder 95 may be provided externally about the cylindrical member 93 for limiting abutment with the upper surface of extension 78. The lower end region of cylinder 93, below carriage extension 78 may be externally threaded, as at 96, and provided with suitable locking means, such as a washer 97 circumposed about the cylinder 93 engaging the under surface of extension 78, and a nut 98 threadedly engaged about the lower region of cylinder 93 and snugged up against the washer 97.

Interiorly of the tool holder cylindrical body 93, there may be provided a generally cylindrical interior hollow 100 which opens upwardly through the upper end of cylindrical body 93, and is provided in its upper region with internal screwthreads 101.

Figure 3:
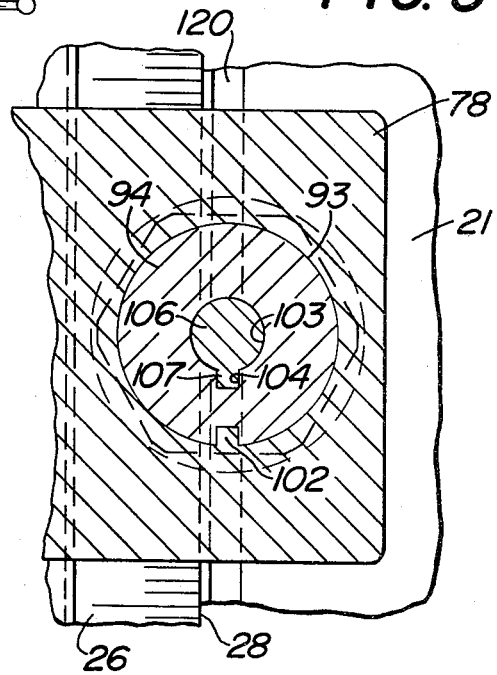
FIG. 3 is a partial horizontal sectional view taken generally along the line 3—3 of FIG. 2.

The cylindrical tool holder body 93 may be non-rotatably engaged in carrier extension opening 91, as by interfitting key means 102, see FIG. 3. Also, the closed lower end wall 94 of cylinder 93 may be provided with a central through opening 103, say of circular configuration and having a key slot 104, for a purpose appearing presently.

A tool is generally designated 105, and may include a generally cylindrical shank 106 extending slidably through opening 103 of lower cylindrical body end wall 94. The shank 106 may be provided with a longitudinal key 107 engaged in key way or slot 104 to limit the shank to longitudinal, up and down movement.

On the lower, exterior end of tool shank 106, there may be provided a cutting tool 108. The cutting tool illustrated in FIGS. 1 and 2 includes, at its working end, a pair of laterally spaced cutting edges 109. The laterally spaced cutting edges 109 may be defined by the formation therebetween of a generally V-shaped groove 110 cooperating with generally parallel external surfaces of the cutters to define cutting edges.

The tool shank 106 is provided internally of the hollow 100 with an enlargement, head or piston 111 shiftable in the hollow 100. A relatively stiff resilient member or coil compression spring 112 may be located in the hollow or chamber 100, on the upperside of enlargement or head 111, while a relatively weak coil compression spring 113 may be located in the hollow 100 interposed between the lower end wall 94 and the head 111.

A threaded plug 114 is threadedly engaged downwardly into the upper end of internal hollow 100, in threaded relation with the screwthreads 101, and movable vertically to a selected position according to the desired spring pressure to be applied against tool 105. That is, more or less insertion of plug 114 downwardly into the hollow 100 will cause greater or lesser spring pressure applied by relatively strong spring 112 downwardly against tool 105. The relatively weak spring 113 serves only to retain the head 111 upwardly against the lower end of strong spring 112. This spring pressure is applied through the tool 105 for cutting of the work 21 as will appear more fully hereinafter.

A collar 115 may extend exteriorly about the plug 114, in the manner of a locknut, if desired, and a handle 116 may extend upwardly from the plug 114 beyond the collar 115 for manual gripping by an operator.

It will now be appreciated that with the elongate body 25 secured in position on a work piece 21, as by the securing means or clamps 50, 51, and with the tool 105 resiliently urged downwardly toward the work piece, it is only necessary to manually grasp the handle 116 and shift the carriage 75 back and forth to effect scoring or cutting of the work piece, as by a groove 120. As best seen in FIG. 2, the backing member or board 58 may be located beneath the groove 120 to support the cutting action. However, the backing member need not necessarily be located beneath the cut to achieve a clean cut free of splintering. That is, by the employment of a pair of adjacent, laterally spaced cutters 109, with the cutters located sufficiently close together, it has been found that the work piece material between the cutters substantially disintegrates or falls apart into relatively small particles to prevent any binding action against the cutters and leave clean finishes on the cut material.

Figure 6:
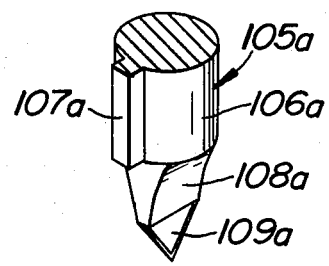
FIG. 6 is a perspective view showing a modified embodiment of tool of the present invention.

While the use of a pair of closely spaced, generally parallel cutting edges, as shown in FIGS. 1 and 2 may be advantageous for the reasons mentioned above, a slightly modified tool 105a, as seen in FIG. 6, may also be employed. It will there be seen that a shank 106a may be provided with a key 107a and the lower or working tool end 108a may include a single cutting edge 109a. With the tool 105a cutting or scoring is achieved, but without the cleanliness of cut and freedom from binding of the tool 105.

Figure 7:
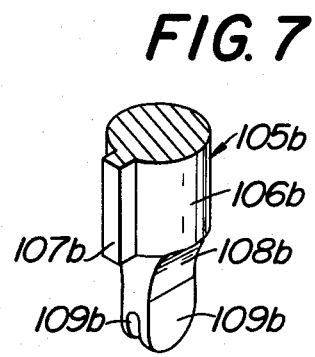
FIG. 7 is a perspective view showing another modified embodiment of tool.

Another slightly modified tool is shown in FIG. 7 and there generally designated 105b, including a shank 106b having a key 107b. The lower or working tool end 108b may be provided with a pair of laterally spaced cutters 109b, which may be similar to the laterally spaced cutters 109 of the first described embodiment, except that the cutters 109b are provided with arcuate cutting edges in contrast to the generally straight parallel cutting edges of the tool 105. The tool 105b achieves the advantageous cleanliness of cut and freedom from binding discussed hereinbefore, but in a slightly different manner.

Figure 8:
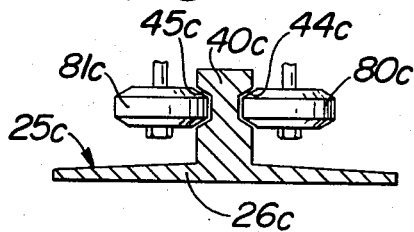
FIG. 8 is a partial sectional view similar to FIG. 2, but showing a modified embodiment of elongate body, track and carriage.

In FIG. 8 is shown a slightly modified elongate body 25c, wherein a base 26c is provided with only a single upstanding longitudinally extending wall or rail 40c. The single rail includes a pair of oppositely outwardly facing longitudinally extending recesses or grooves 44c and 45c respectively receiving carriage mounting wheels or rollers 80c and 81c. In this embodiment, a carriage may be mounted for reciprocatory movement along the body 25c by means of a single rail defining a track constraining the wheels 80c and 81c to movement along the track.

Figure 9:
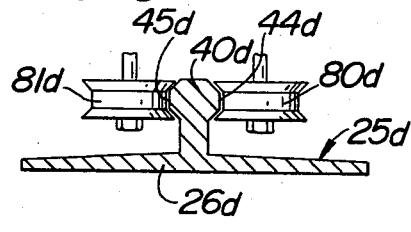
FIG. 9 is another transverse sectional view similar to FIG. 8 showing still another modified embodiment of elongate body, track and carriage.

Still another embodiment of elongate body 25d is shown in FIG. 9, wherein a base 26d is provided with a single upstanding rail 40d. The rail 40d is provided on its opposite sides with a pair of longitudinally extending ribs 44d and 45d. Carriage wheels or rollers 80d and 81d are respectively rollable along ribs 44d and 45d to constrain a carriage to back and forth movement along the body 25d. However, the ribs 44d and 45d are of convex configuration for conforming engagement with wheels 80d and 81d which are of concave configuration. This contrasts to the previously described embodiments where the wheels are of convex configuration for conforming rolling engagement in grooves of concave configuration.

From the foregoing, it is seen that the panel cutting and scoring device, and method therefor of the instant invention possess numerous advantages over conventional means, including simplicity in operation, safety to the operator, absence of air pollution and noise, depth of cut can be controlled, and otherwise fully accomplishes its intended objects.

Although the present invention has been described in some detail by way of illustration and example for purposes of clarity of understanding, it is understood that certain changes and modifications may be made within the spirit of the invention.

What is claimed is:

1. A sheet cutting and scoring device comprising an elongate body for positioning on one face of a sheet to be worked, track means extending longitudinally along said body, a carriage on said track means for movement along said body, a lateral extension on said carriage extending laterally beyond said body for movement therealong over the sheet, a tool holder carried by said extension, and a tool depending from said extension for movement therewith in cutting engagement with the sheet, said tool holder comprising an upstanding hollow cylinder fixed to said extension outboard of said body, and said tool comprising a shank depending from said cylinder and vertically slidable toward and away from the sheet to be worked, a cutting element on the lower end of said shank for engagement with the sheet, and resilient compression means in said cylinder urging said shank downwardly for engaging the cutting element with the sheet.

2. A sheet cutting and scoring device according to claim 1, in combination with clamping means for clamping said body to the sheet, said clamping means comprising clamping elements extending outwardly from opposite ends of said body and into facing relation with the other sheet face, a transverse rod on the upper region of each of said clamping elements, said body having upwardly facing slots for receiving said rods, and screw means on the lower regions of said clamping elements for bearing engagement with the other sheet face.

3. A sheet cutting and scoring device according to claim 1, said track comprising at least one upstanding rail extending longitudinally along said body, and said carrier comprising generally horizontal wheel means constrained to rolling engagement with said rail.

4. A sheet cutting and scoring device according to claim 3, said tool comprising a pair of adjacent spaced cutting edges for making a pair of adjacent spaced cuts in the sheet, said cutting edges comprising knife edges parallel to said body and symmetrical about an axis normal to said body for cutting on both directions of movement.

5. A sheet cutting and scoring device according to claim 4, said cutting edges being sufficiently close together so that the sheet material between said cuts substantially falls apart.

6. A sheet cutting and scoring device according to claim 1, in combination with a head on the upper end of said shank within said cylinder, a vertically adjustable plug in said cylinder over said head, said resilient compression means being interposed between said head and plug for urging said shank downwardly with a force corresponding to the vertical positioning of said plug, and additional resilient means yieldably urging said shank upwardly to maintain said head engaging said resilient compression means.

* * * * *